United States Patent
Rafn et al.

(10) Patent No.: US 10,382,213 B1
(45) Date of Patent: Aug. 13, 2019

(54) CERTIFICATE REGISTRATION

(71) Applicant: Amazon Technologies, Inc., Seattle, WA (US)

(72) Inventors: Mark Edward Rafn, Cambridge (GB); Ashutosh Thakur, Bellevue, WA (US); Rameez Loladia, Seattle, WA (US); James Christopher Sorenson, III, Seattle, WA (US); Christoph Saalfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 15/250,709

(22) Filed: Aug. 29, 2016

(51) Int. Cl.
*H04L 9/32* (2006.01)
(52) U.S. Cl.
CPC .................................. *H04L 9/3268* (2013.01)
(58) Field of Classification Search
CPC ..... H04L 9/006; H04L 9/0825; H04L 9/3263; H04L 9/3265; H04L 9/3268
See application file for complete search history.

(56) References Cited

U.S. PATENT DOCUMENTS

| | | | |
|---|---|---|---|
| 9,397,980 B1* | 7/2016 | Chen | H04L 9/3263 |
| 2006/0282670 A1* | 12/2006 | Karchov | H04L 63/0823 713/175 |
| 2007/0277248 A1* | 11/2007 | Agrawal | G06F 8/60 726/30 |
| 2009/0288138 A1* | 11/2009 | Kalofonos | H04L 9/3073 726/2 |

* cited by examiner

*Primary Examiner* — Ellen Tran
(74) *Attorney, Agent, or Firm* — Thorpe North & Western, LLP.

(57) ABSTRACT

A technology is provided for certificate authentication for registering a certificate in computing service environment. A request may be received to register a certificate authority (CA) certificate. A registration token associated with a customer account in a service provider environment may be generated to enable association of the customer account with the CA certificate and to authenticate a registration of the CA certificate. The registration token may be sent to a requester desiring to register the CA certificate. A verification certificate that contains the registration token and that is signed by a certificate authority (CA) of the CA certificate and the CA certificate that is signed by the CA may be received to register the CA certificate with the customer account within a service provider environment The CA certificate is persisted with the service provider environment after verifying the registration token is associated with the customer account and the CA certificate is signed by the CA.

20 Claims, 11 Drawing Sheets

CERTIFICATE REGISTRATION

BACKGROUND

Computing systems may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications. For example, some computing systems may act as a service that provide virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services.

Many times computing devices may be designed to process data content or applications that may be desired to be secure. Moreover, computing devices may also be configured to access a secured computing system, such as a service provider environment. Such computing systems, content, and/or applications may use security protocols, encryption, and other security features to communicate securely and access secure information. While the desired specific security and authentication protocols or requirements may be useful, current authentication protocols may be insufficient and inadequate to scale to meet the large demand for security authorization and authentication as computing functionality is increasingly used in all types of mobile device and devices that are part of the Internet of Things (IoT). Devices enabled with IoT functionality are expected to be numbered in the billions or trillions over the next few years and such devices are expected to use security solutions for communicating with networked resources.

DETAILED DESCRIPTION

Figure 1:
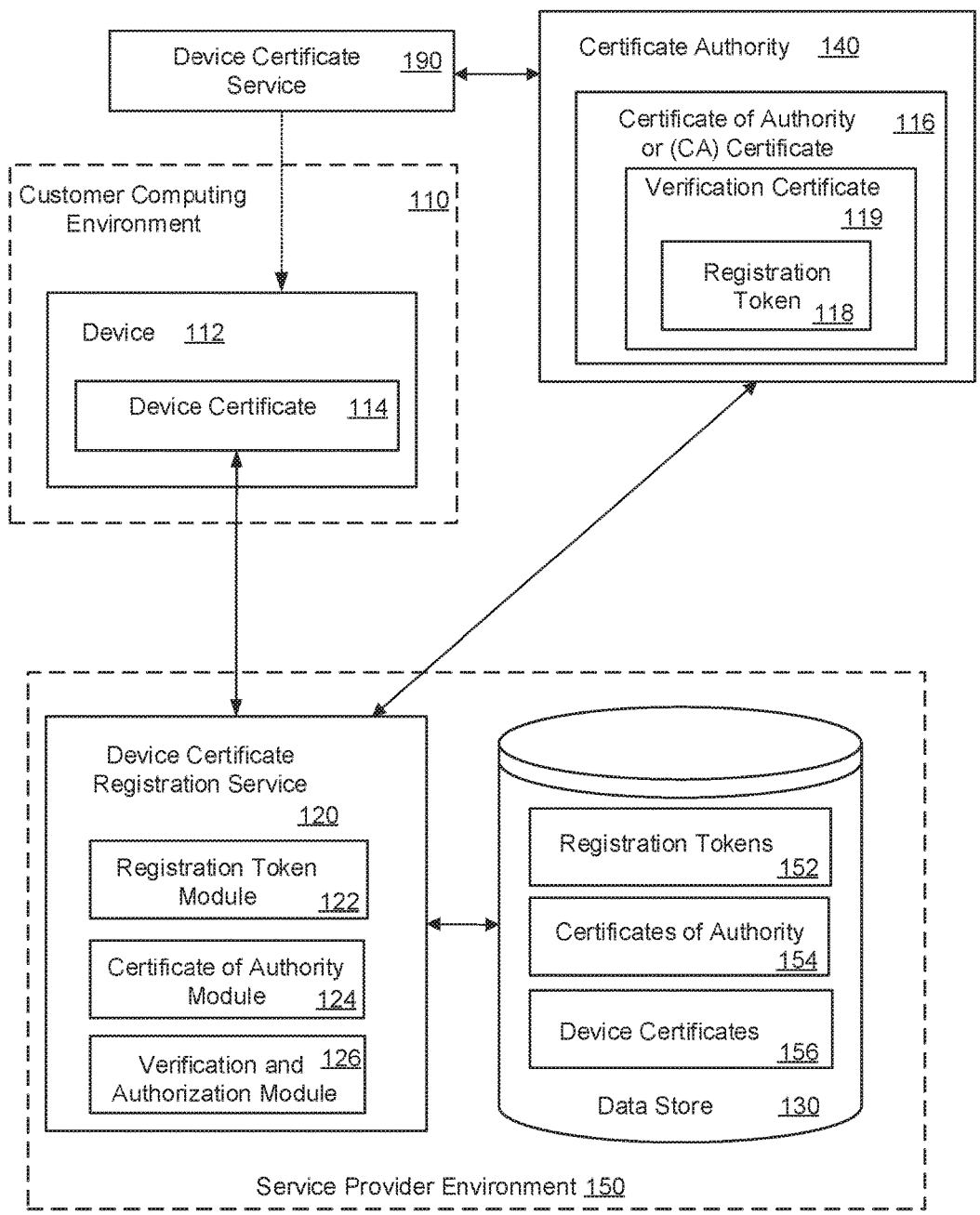
FIG. 1 illustrates a system for certificate authentication for registering a certificate with a service provider environment according to an example of the present technology.

This technology provides computing systems with robust means to authenticate or verify the authority of a customer, a computing device (e.g., a computer, a server, a mobile device, smart phone, a tablet), and/or other digital devices to access a computing system or computing services, such as a service provider environment. A digital certificate may be used as the means to authenticate and/or verify customers, computers, or other digital devices which desire to access the computing system. For example, a digital certificate may be used to access services or applications that use strong authentication to enable access to the service provider environment.

In one aspect, the present technology provides certificate authentication for registering a certificate with a service provider environment. A request may be received by a service provider environment to register a certificate authority (CA) certificate. A registration token associated with an account of a customer in a service provider environment may be generated to enable association of the customer account with the CA certificate and to authenticate a registration of the CA certificate. The registration token may be sent to a requester desiring to register the CA certificate. The CA certificate may be signed by a certificate authority (CA) (e.g., either self-signed or signed by a third party). A verification certificate may be generated to include the registration token and the verification certificate may also be signed by the CA of the CA certificate. The verification certificate that contains the registration token and that is signed by a certificate authority (CA) of the CA certificate and the CA certificate that is signed by the CA may be sent to the service provider environment to register the CA certificate with the customer account within a service provider environment After receiving the CA certificate and the verification certificate from the requester, the service provider environment may then verify that the CA certificate is signed by the CA and verify that the registration token is included in the verification certificate, is associated with the customer, and has been signed by the CA of the CA certificate. If the registration token is valid and associated with the customer, the verification certificate has been signed by the CA of the CA certificate, and the CA certificate has also been signed by the CA, then the CA certificate may be associated with a customer's account. The CA certificate may then be persisted with the service provider environment. Storing the CA certificate allows the CA certificate to act a root certificate for the requester. Later device certificates which are subordinate to the CA certificate may be registered for individual devices and validated using the CA certificate.

For example, a message queuing telemetry transport (MQTT) service may use certificate authentication, for which 1) a customer is to prove that the customer has a private key for the CA certificate, and 2) the service provider environment may recognize that CA certificate and associate the CA certificate with a customer account. By employing the certificate authentication workflow for registering a CA certificate (also referred to herein as "bring your own certificate") client-generated certificates may be allowed to enable access to, use of, and/or connection to one or more services, data stores, and/or applications within a service provider environment. The certificate authentication operations for registering the CA certificate may provide proof of possession of the CA certificate that enables customers to simultaneously prove that an unknown CA certificate (e.g., a previously-unseen or unknown CA certificate by the service provider environment) belongs to the customer and enables the customer to prove that the customer is an authenticated and authorized customer of the service provider environment. Following the authentication and authorization of the CA certificate, the CA certificate may be persisted in the service provider environment. That is, the CA certificate is registered and stored as a valid, authorized, and authenticated CA certificate within the service provider environment.

In one aspect, a connection with the service provider environment may be established for registering the CA certificate. The connection may be a temporary connection for registration purposes alone since the service provider environment has yet to authenticate or authorize the CA certificate. In one configuration, only messages relating to the registration of the CA certificate may be allowed through the temporary connection, such as, for example, a request to associate the CA certificate with the service provider environment. This request may contain the public certificate information of the CA certificate (signed by the CA) and may include a temporary registration code provided by the service provider environment in order to prove that the CA certificate is associated with an authorized customer of the service provider environment. In this way, the provided message is double-authenticated. That is, the CA certificate is authenticated using the public key of the CA certificate, but a customer is not yet authorized to access the service provider environment. In addition, the temporary registration code provided by the service provider environment (e.g., the temporary registration code signature or authentication token), which may be included in a verification certificate that is also signed by the CA of the CA certificate, may provide authentication that the CA certificate is authorized to be associated with customer's account in the service provider environment. The CA certificate may be registered with the service provider environment thereby establishing that the CA certificate is owned by the customer, and by checking the registration code the CA certificate may be associated with the customer's account in the service provider environment.

In a further aspect, a request may be received from a device to register a device certificate. The device certificate may be subordinate to the CA certificate and may be validated using the CA certificate. That is, the device certificate may be a child certificate of the CA certificate, and the device certificate may be associated with the CA certificate. Upon validation and registration of the device certificate, access to the service provider environment for a device associated with the device certificate may be provided.

FIG. 1 illustrates a system 100 for certificate authentication for registering a CA certificate (i.e., a public key certificate) in a service provider environment 150 according to an example of the present technology and for using device certificates to enable device communications with the service provider environment 150. The system 100 may include computing environment 110, a customer computing environment 110, a certificate authority 140, and/or a service provider environment 150. The computing environment 110, the certificate authority 140, and the service provider environment 150 may each be associated with and/or in communication with each other, by one or more communication methods, such as a computing network. In one example, the certificate authority 140 and device 112 may be controlled by the same owner or customer. In another example, the certificate authority 140 may be a certificate authority 140 that is completely independent of customer of the service provider environment 150.

In one aspect, a certificate authority 140 may include a certificate of authority 116 (or CA certificate). The certificate authority 140 may be associated with a verification certificate 119. That is, the verification certificate 119 may be generated to include the registration token 118 and the verification certificate 119 may be a child certificate of the CA certificate 118. The registration token 118 (i.e., a registration code) may have been received from the service provider environment 150. The certificate of authority 116 may be registered with the service provider environment 150 by submitting to the service provider environment 150 both the verification certificate 119 that contains the registration token 18 and that is signed by a certificate authority (CA) of the CA certificate and the CA certificate that is signed by the CA to register the CA certificate with the customer account within a service provider environment. The certificate of authority 116 may be a root certificate. The certificate authority 140 may issue multiple certificates in the form of a tree structure. The root certificate is the top-most certificate of the tree, the private key of which is used to "sign" other certificates. The certificates immediately below the root certificate inherit the trustworthiness of the root certificate. Certificates further down the tree also depend on the trustworthiness of the intermediates, often known as subordinate certificate authorities.

It should be noted that the verification certificate that contains the temporary registration token 118 is child certificate to the CA certificate 118 and is signed by the CA of the CA certificate 118. The device certificate 114 may be subordinate to the CA certificate 118 and may be validated using the CA certificate 118. That is, the device certificate may also be a child certificate of the CA certificate 118, and the device certificate 114 may be associated with the CA certificate 118. Upon validation and registration of the device certificate 114, access to the service provider environment 150 for the device 112 associated with the device certificate 114 may be provided. The CA certificate 118 may act as root certificate to the verification certificate 119 and/or the device certificate 114. Later device certificates which are subordinate to the CA certificate 118 may also be registered for individual devices and validated using the CA certificate 118. That is, the CA certificate 118 may be a parent certificate for a child device certificate 114 or a child verification certificate 119.

In one aspect, the service provider environment 130 may include a certificate registration service 120. The device certificate registration service 120 may include a registration token module 122, a certificate of authority (CA) module 124, and/or a verification and authorization module 126. The service provider environment may also include a data store 130. The data store may store registration tokens 152, certificates of authority 154, and/or device certificates 156. The service provider environment 150 may provide virtualized computing services (i.e., virtualized computing, virtualized storage, virtualized networking, etc.) to devices 112 in the customer computing environment 110. More specifically, the service provider environment 150 may provide virtualized computing, virtualized storage, virtualized networking and other virtualized services that are executing on a hardware substrate.

In one aspect, the device certificate registration service 120 may generate, a registration token 118 using the registration token module 122, which is associated with an account of a customer in the service provider environment 150 to enable association of the customer account with the CA certificate 116 and to authenticate a registration of the CA certificate 116. The registration token 118 generated by the registration module 122 may be sent to a requester, such the certification authority 116, desiring to register the CA certificate 118. Each registration token generated by the registration token module 122 may be stored in with the registration tokens 152. The registration token 118 may be a temporary registration token (i.e., registration code) that may be used for the purposes of registering the CA certificate. The CA certificate 116 may be signed by a certificate authority (CA) 140 and the registration token 118 that is associated with the CA certificate 118 may be received by the service provider environment 150, along with the CA certificate, to register the CA certificate 116 within the service provider environment 150. The CA certificate 116 may be persisted in the certificates of authority 154 with the service provider environment 150 by verifying that the registration token 118 is a valid registration token provided by the service provider environment 150 and the CA certificate 116 is signed by the CA 140. The registration token 118 may then be stored as one of the registration tokens 152. The CA certificate may then be registered with the service provider environment by verifying the registration token is associated with an account of the service provider environment and the CA certificate is signed by the CA. The registered CA certificate may be stored with the certificates of authority 154 in the data store. In one aspect, the computing environment 110 may include a device 112, which may be a computing device, such as for example, a server, a computer, a tablet, and/or a smart phone. The device 112 may include a device certificate 114. For example, the device certificate 114 may be defined as a public key certificate. In one aspect, the device certificate 114 can be placed or uploaded in the device by a device certificate service 190, which may be provided by a third party. The third party device certificate service 190 may embed device certificates into hardware devices (e.g., during manufacturing or installation), which may enable the service provider environment 150 to perform strong authentication of the device 112. In one aspect, a manufacturer of the device 112 can provide a Media Access Control (MAC) address or unique device identifiers along with the device certificate. In one aspect, the device certificate 112 can be a digital certificate that can use a public key infrastructure (PKI) standard to verify that a public key belongs to the user, device, computer, and/or service identity contained within device certificate 112.

The CA certificate may be associated with a device certificate 114 to enable registration of the device certificate 114 with the service provider environment 150. Once the device certificate 114 has been registered, the device certificate 114 may be stored with the device certificates 156 in the data store. In one aspect, the device certificate may be subordinate to the CA certificate. For registering the device certificate 114, the certificate registration service 120 may receive a request from the device 112 to register the device certificate 114. The device certificate may be subordinate to the CA certificate and may be validated using the CA certificate. The device certificate 114 may be associated with the CA certificate 116 that is stored in the certificates of authority 154. Upon validation and registration of the device certificate, access to the service provider environment for a device associated with the device certificate may be provided.

Figure 2:
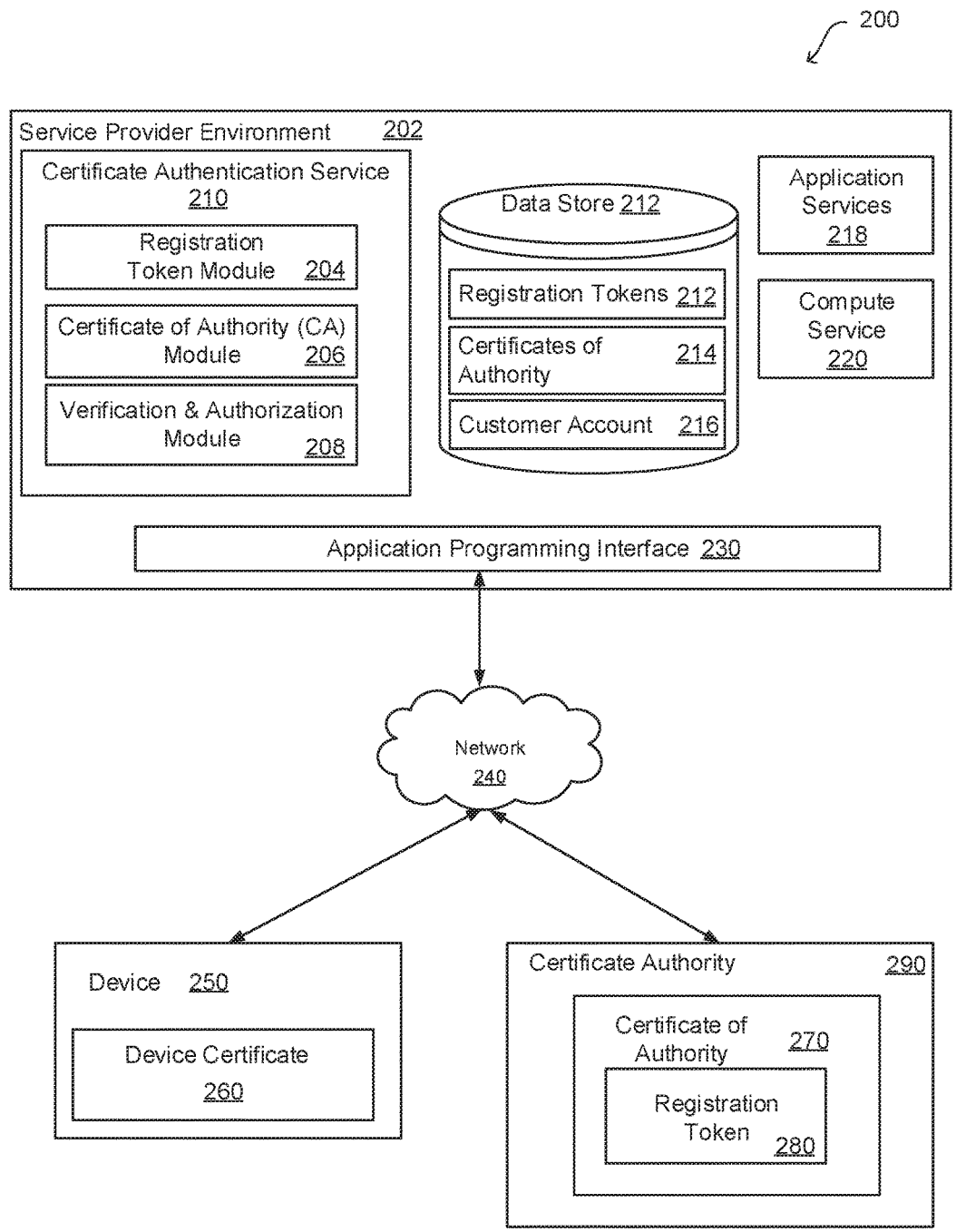
FIG. 2 illustrates an additional system for certificate authentication for registering a certificate authority (CA) certificate with a service provider environment according to an example of the present technology.

FIG. 2 illustrates an additional system for certificate authentication for registering a certificate authority (CA) certificate in a service provider environment according to an example of the present technology. In one aspect, each of the components, modules, and/or services described in FIG. 1 may also apply to the components, modules, and services of FIG. 2. Also, one or more of the operations steps of FIG. 1 may also be included in one or more operations or actions of FIG. 2.

The system 200 may include a service provider environment 202, a device 250, and a certificate authority 290. The certificate authority (CA) 290, the device 250, and the service provider environment 202 may each be associated with and/or in communication with each other, by one or more communication methods, such as computing network 240.

In one aspect, the device 250 may include a device certificate 114. In addition, the certificate authority 290 may include a certificate of authority (CA) 270, and a registration token 280 received from the service provider environment 202. The service provider environment 202 may include a certificate authentication service 210 which may receive and authenticate certificates. The certificate authentication service 210 may include a registration token module 204, a certificate of authority (CA) module 206, and/or a verification and authorization module 208.

The service provider environment 202 may also include a data store 212. The data store 212 may include registration tokens 212 that are currently generated and/or have been previously generated, certificates of authority 214 (e.g., a collection of CA certificates) that have been previously authenticated, and/or customer accounts 216. The service provider environment 202 may also include an application programming interface 230 for receiving one or more API calls from the device, one or more application services 218 for performing a services in the service provider environment 202, and/or a compute service 220.

The compute service 220 may include computing instances or other services which may provide independent services to the device 250. In some configurations, the computing instances may include a program code that is capable of executing on a computing instance. The program code can be a segment of program code that may be like a function, and the program code may receive parameters, perform processing and provide return values. Once the program codes complete the program codes are removed from memory. The program code may also be called a "compute service code" or "compute service program code."

In operation, by way of example only, a request may be received by the service provider environment 202 via the API 230 to register the CA certificate 270. The registration token module 204 may generate a registration code, such as registration token 280, which may be associated with a customer account 216 of the service provider environment 202. The registration token 280 may be sent to a requester, such as the certificate authority 290, desiring to register the CA certificate 270. The CA (certificate authority) certificate 270 associated with a certificate authority (CA) 290 may be verified and authorized by the verification and authorization module 208. Also, the registration token 280 may also be verified and authorized by the verification and authorization module 208 to register the CA certificate 270 within the service provider environment 202, and associate the CA certificate 270 with the customer account 216 of the service provider environment 202. The CA certificate 270 may be registered by the CA module 206 of the service provider environment 202 by verifying that the registration token 280 is associated with the customer account 216 via the verification and authorization module 208 and the CA certificate is signed by the CA 290. Thus, the CA certificate 270 with a public key of the CA 290 and the registration token that is associated with the customer account 216 may be authorized and/or authenticated in order to register the CA certificate 270.

The device certificate 260 may be registered within the service provider environment 202 in a similar fashion. Specifically, the device certificate 260 may be registered with the service provider environment 202 to access one or more services, such as the application services 218 within the service provider environment by verifying that the device certificate 260 is associated with the CA certificate 270. More specifically, the private key of the CA certificate 270 has been used to sign the subordinate certificate or CA certificate 270 and the public key of the CA certificate may then be used to validate the device certificate 260. In one aspect, access to the service provider environment 202 may be provided for the device 250 upon registering the device certificate 260 and validating that the device certificate 260 is associated with the CA certificate 270. Access to one or more application services 218 within the service provider environment 202 may be provided for the device 250 associated with the device certificate 260 and may be provided upon registering the device certificate 260. Access to one or more compute services 220 within the service provider environment 202 may also be provided upon registering the device certificate 260. A registration state of the device certificate 260 may be changed and/or updated. In one aspect, upon registering the device certificate 260, a notification of the registration event for the device certificate 260 may be issued in order for one or more applications, compute service codes, or other logic to be attached to or associated with the device 250.

In one aspect, a customer associated with the customer account 216 may register the customer's CA certificate 270 prior to the registration of the device certificate 260. To prevent a customer from registering with the service provider environment 202 with any CA certificate (e.g., a public CA certificate), which may not be owned by a customer, the customers and/or requestor may prove the possession of a private key for the customer's CA certificate 270. The requestor (e.g., the customer) may be able to generate the customer's CA certificate 270 signed by the certificate authority 290 upon a customer having corresponding private keys of the CA certificate 270 (e.g., a self-signed certificate or third party signed certificate). This means if the customer creates a CA certificate using the CA's private key and uploads a CA certificate to register the CA certificate 270, the service provider environment 202 can then verify, identify, and/or determine the customer possesses the private key and the customer's own CA certificate. In an additional aspect, a customer may be uploading a certificate of authority 270, which may be made and/or generated specifically for CA certificate registration purposes. To do this, the customer may include the registration token 280 generated by the service provider environment 202 in the CA certificate 270, such as in the subject field of the CA certificate 270.

Figure 3:
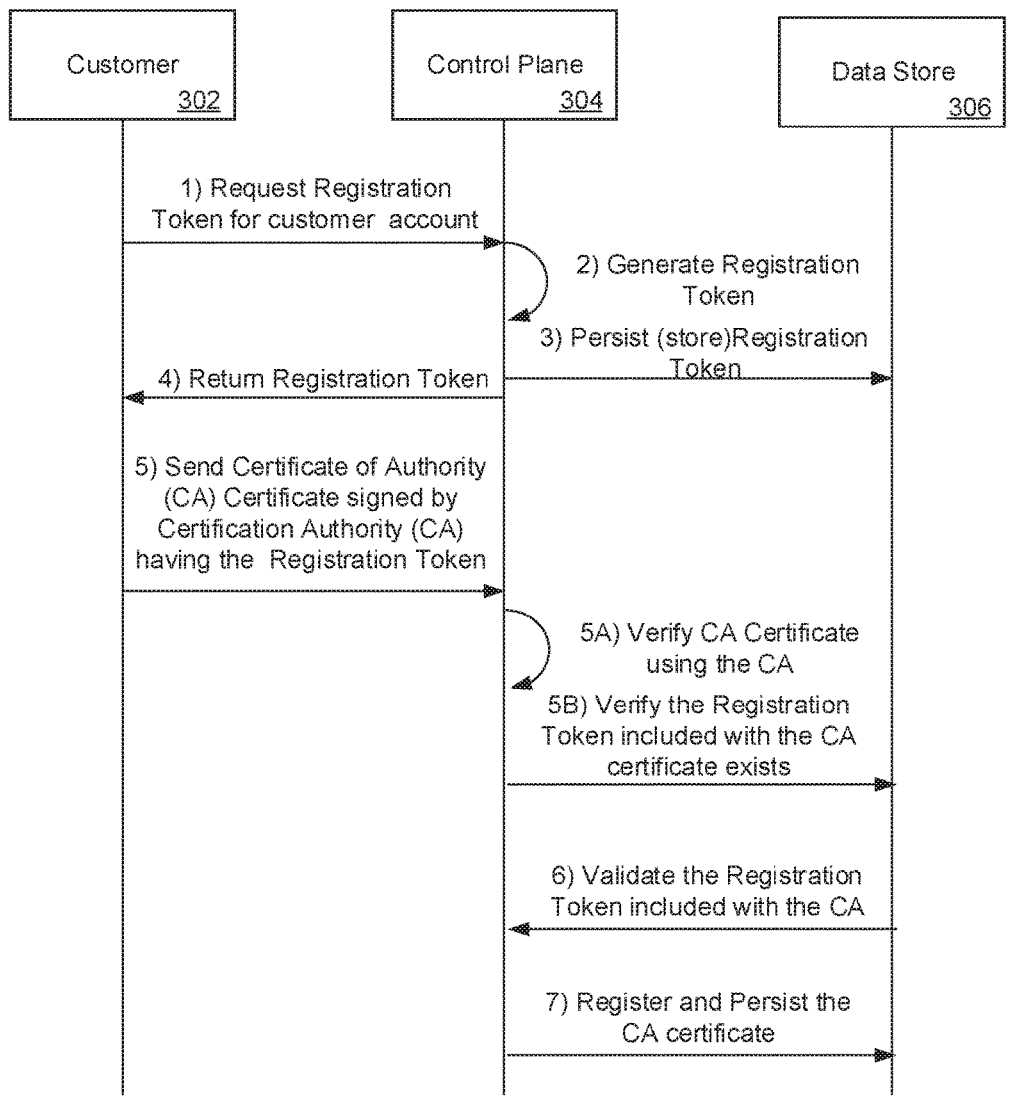
FIG. 3 illustrates a system for Just-In-Time Registration for registering a certificate authority (CA) certificate with a service provider environment according to an example of the present technology.

FIG. 3 illustrates a system for a Just-In-Time Registration 300 for registering a certificate authority (CA) certificate in a service provider environment according to an example of the present technology. In one aspect, each of the components, modules, and/or services described in FIGS. 1-2 may also apply to the components, modules, and services of FIG. 3. Also, one or more of the operations and steps of FIGS. 1-2 may also be included in and/or occur prior to one or more operations or actions of FIG. 3.

As depicted in FIG. 3, a customer 302 may 1) issue a request (e.g., an API call) to request a registration token (or "registration code") for the customer account. A control plane 304 of a service provider environment, such as the service provider environment 202 of FIG. 2, may 2) generate a registration token. In one aspect, the registration token may include one or more customer account authentication or authorization credentials (e.g., authentication and identity management information) to indicate the customer 302 has authentication and/or authorization to access the customer account associated with the service provider environment. The control plane 304 may also 3) persist (store) the registration token in a data store 306 and 4) send the generated registration token back to the customer 302.

In one aspect, the customer 302 may 5) send to the control plane 304 a certificate of authority (CA) certificate that is signed by certificate authority (CA) and also includes the registration token. The control plane may 5A) verify the CA certificate using the CA (decrypting the signature with the public key can prove the customer 302 owns the private key of the CA certificate) and 5B) verify, using the data store, the registration token that is included in the CA certificate exists in the data store 306. The control plane 304 may 6) receive verification and validation, using the data store 306, that the registration token included in the CA certificate exists or is persisted in the data store 306. 7) The CA certificate may be registered with service provider environment and the CA certificate may be stored (e.g., persisted) in the data store.

Figure 4:
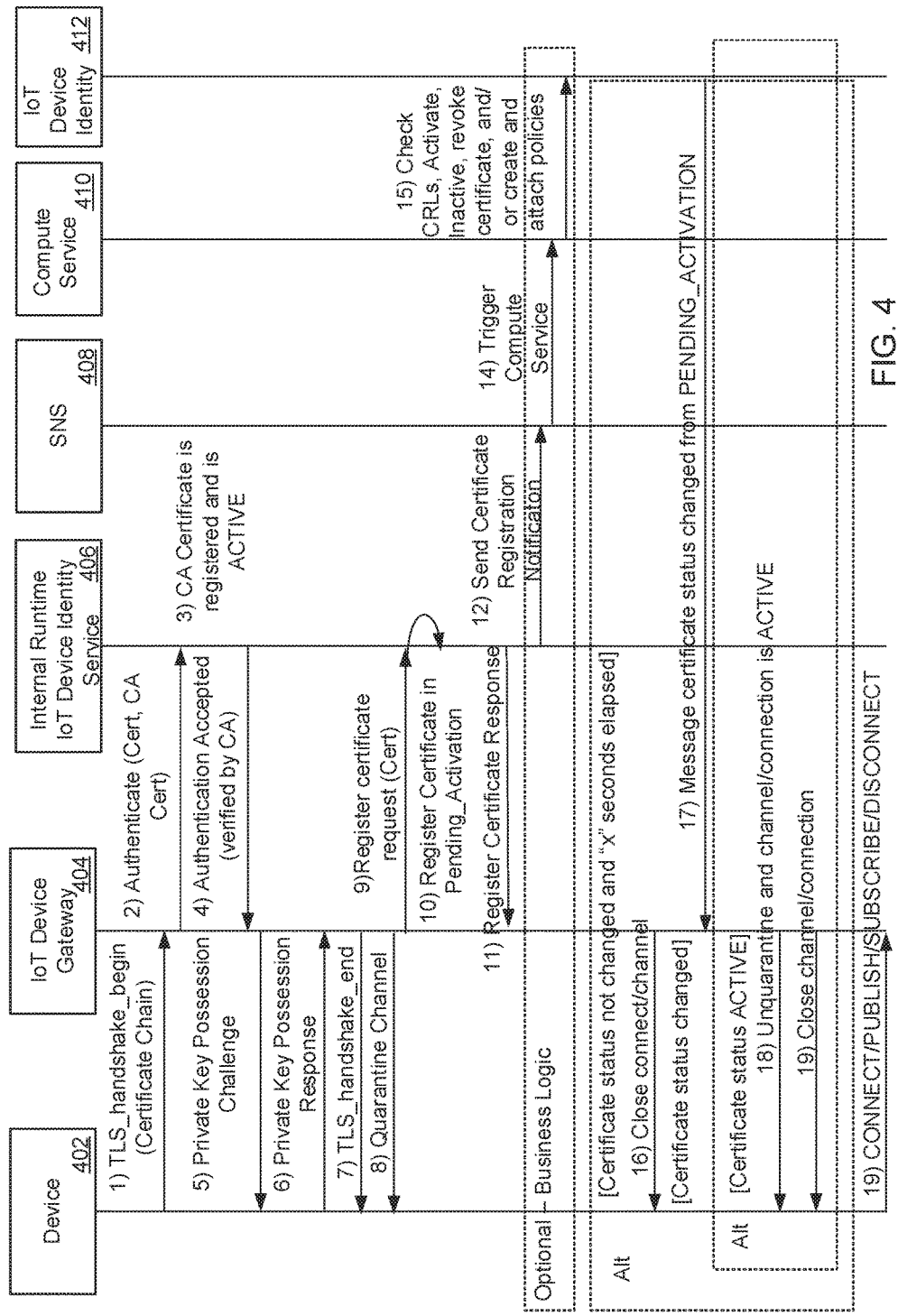
FIG. 4 illustrates a flow diagram of an example of first time registration of a device according to an example of the present technology.

FIG. 4 illustrates a flow diagram of an example of first time registration of a device using a device certificate according to an example of the present technology. In one aspect, each of the components, modules, and/or services described in FIGS. 1-3 may also apply to the components, modules, and services of FIG. 4. Also, one or more of the operations and steps of FIGS. 1-3 may also be included in and/or occur prior to one or more operations or actions of FIG. 4.

It is assumed in FIG. 4 that a CA certificate is registered with the service provider environment (e.g., registered with an IoT (Internet of Things) device gateway of the service provider environment) and is active (as described in FIG. 3). Also, a customer may have configured a simple notification service (SNS) topic with a role for an IoT device of the service provider and compute service. In one aspect, the SNS may be a web service that enables applications, end-users, and/or devices to instantly send and/or receive notifications from the service provider environment.

As illustrated in FIG. 4, device 402 1) may connect to an IoT device gateway 404 using the device certificate and the CA certificate by issuing a transport layer security (TLS) handshake for registering a device certificate with a service provider environment. In one aspect, the TLS handshake may be a (TLS) Handshake Protocol responsible for the authentication and key exchange necessary to establish or resume secure sessions. For example, establishing a secure connection between the device 402 and the IoT device gateway, the handshake protocol may include cipher suite negotiation, authentication, and/or session key information exchange. That is, the TLS may make a secure connection with the IoT device gateway 404 using symmetric encryption on a per session basis. The IoT device gateway 404 identifies the device certificate as an unknown certificate, and 2) attempts to 3) authenticate the device certificate using the internal runtime IoT device identity service 406. The internal runtime IoT device identity service 406 3) verifies that a valid CA certificate is registered and has an ACTIVE state in the service provider environment and is associated with the device certificate. The IoT device gateway 404 is 4) notified that the authentication of the device certificate is accepted and verified using the CA certificate (e.g., the CA certificate's public key).

The IoT device gateway 404 5) provides to the device 402 a private key possession challenge (e.g., a message to be encrypted using the private key of the device certification). The device 402 6) provides a private key possession response to the IoT device gateway 404. The IoT device gateway 404 may 7) end the TLS handshake with the device 402. By completing the TLS handshake, the device 402 has proved its ownership of private key of the device certificate.

In one example configuration, upon completion of the TLS handshake, the IoT device gateway 404 can 8) enable a quarantined connection with the device 402. The IoT device gateway 404 may 9) request to register a device certificate as having a 10) "PENDING ACTIVATION" state, and 11) a register device certificate response may be received from the internal runtime IoT device identity service 406. The internal runtime IoT device identity service 406 may 12) send a device certificate registration notice to the SNS 408 (e.g., send to the SNS a customer-defined topic). The SNS 408 may 14) trigger a compute service 410 (e.g., trigger the compute service 410 using one or more customer defined program codes or logic for executing one or more services and/or functions of the service provider environment. In one aspect, the compute service 410 may 15) check certificate revocation lists (CRLs), using an IoT device identity 412, or determine if the device certificate is active, inactive, and/or revoked. Also, the compute service 410 can create and/or attach one or more policies that may define how the device 402 use the service provider environment.

For example, a recommendation may be made to a customer to define a program code in a compute service 410 using a defined programming logic for activating a device certificate and attaching policies to the device certificate. The compute service 410 may be linked to the SNS 408 topic on which device identity service 406 may send SNS 408 a notification upon registering the device certificate. In one aspect, a successful certificate registration and/or unsuccessful certificate registration notification may be sent. The compute service 410 or a program code in the compute service 410 may be programmed to handle both the cases. In one aspect, the compute service 410 may a) check that a device certificate is not in a certificate revocation list (CRL), b) determine if the device certificate is in an ACTIVATE, INACTIVE, and/or REVOKED status, c) create one or more a policies, d) attach one or more policies to the device certificate, e) create a registry, f) attach a device certificate to a registry, and/or g) create shadow object for the device (e.g., IoT device) in the service provider environment.

In one aspect, the connection can be held in quarantine for a selected time period, such as, for example 30 seconds, before the quarantined connection is closed by the IoT device gateway 404. The device certificate's status may be changed by the compute service 410, as discussed above. In one aspect, the 16) connection (e.g., a quarantined channel) may be closed between the IoT device gateway 404 and the device 402 if the certificates status is not changed to ACTIVE within the defined quarantine window. It should be noted that the quarantine operation of quarantining a connection may be optional.

In one aspect, one or more optional operations can be applied (indicated in FIG. 4 as "optional-business logic" or as an alternative option herein after as "alt"). For example, in one aspect, if the device certificate's status has not changed and following the expiration of a selected time period (e.g., 40 seconds), the quarantined connection may be closed by the IoT device gateway 404. In one aspect, the status change of the device certificate can change from PENDING ACTIVATION to ACTIVE. At this point, the IoT Device Identity service 412, may 17) issue a message certificate status call (e.g., a "stumpy" call) so the status may be changed and sent to the IoT device gateway 404 to close the connection if the device certificate is marked as INACTIVE or REVOKED and/or close the connection if the device certificate has not been activated. If the device certificate is activated, the connection may be 18) unquarantined and may be an active connection between the device 402 and the IoT device gateway 404. 19) The connection between the IoT device gateway 404 and/or the device 402 can also be closed. In an additional aspect, the device 402 may connect, publish, subscribe, and/or disconnect with/from the IoT device gateway 404.

As used herein, the IoT gateway device 404 may include an identity and access management stack and an authentication/authorization runtime. The PENDING ACTIVATION can be a new state of a certificate. For example, a registered device certificate can be put into the PENDING ACTIVATION state. A connection for a certificate with PENDING ACTIVATION state may be in a quarantined connection. A certificate with PENDING ACTIVATION state can connect for some time before there is a disconnection or unquarantine connection operation performed. The quarantined state of the connection is where the device, such as device 402, remains connected but may not perform any operation within the service provider environment, except, for operations requested by the service provider environment for registration purposes only. The IoT device gateway 404 may not process any request bytes from the device 402 when in quarantine mode and any bytes from the device 402 may be buffered. The quarantine connection may remain open for some defined time period prior to being disconnected by either the device 402 or IoT device gateway 404. The quarantine connection may be unquarantined if a certificate is ACTIVATED. In one aspect, the connection may be a MQTT connection with the IoT device gateway 404 established using a TLS mutual authentication operation.

Figure 5:
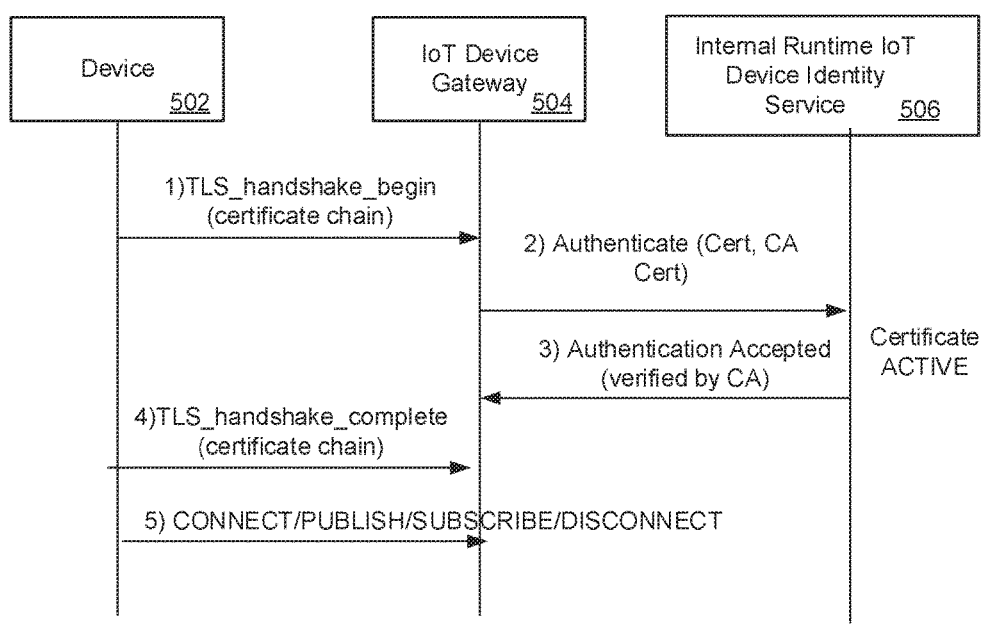
FIG. 5 illustrates an example of a device connecting with a registered device certificate in an active state according to an example of the present technology.

FIG. 5 illustrates an example of a device connecting with a registered certificate in an active state according to an example of the present technology. In one aspect, each of the components, modules, and/or services described in FIGS. 1-4 may also apply to the components, modules, and services of FIG. 5. Also, one or more of the operations and steps of FIGS. 1-4 may also be included in and/or occur prior to one or more operations or actions of FIG. 5.

As illustrated in FIG. 5, a device 502 1) connects to an IoT device gateway 504 using the device certificate by issuing a transport layer security (TLS) handshake for authenticating a device certificate with a service provider environment. The IoT device gateway 504 can 2) issue an authentication request for the device certificate to an internal runtime IoT device identity service 506. That is, the internal runtime IoT device identity service 506 verifies that the device certificate that is associated with the CA certificate is in an active state in a service provider environment. The internal runtime IoT device identity service 506 3) sends a message to the IoT device gateway 504 that the authentication request to authenticate the device certificate is verified and accepted. 4) The IoT device gateway 504 receives a message from the device 502 that the TLS handshake for authenticating a device certificate with a service provider environment is complete. The device 502 can then 5) connect, publish, subscribe, and/or disconnect with the IoT services (e.g., publication/subscription messaging services) upon the device certificate being authenticated in the service provider environment.

In summary, the device 502 may connect to the IoT device gateway 504 using the device certificate. The IoT device gateway 504 identities the device certificate as a registered certificate having an ACTIVE state. By completing a TLS handshake, the device 402 has proved its ownership of private key. The device 502 may connect and publish or subscribe to a service successfully to a service provider environment.

Figure 6:
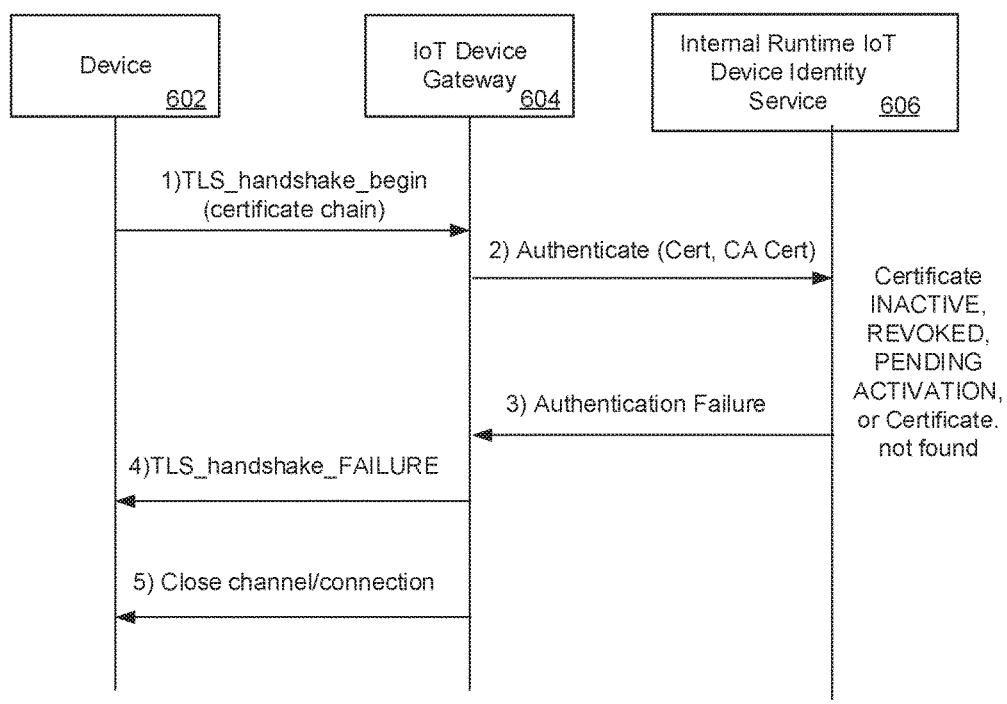
FIG. 6 illustrates an example of a device connecting with a registered device certificate in an inactive or revoked state according to an example of the present technology.

FIG. 6 illustrates an example of a device connecting with a registered certificate in an inactive or revoked state according to an example of the present technology. In one aspect, each of the components, modules, and/or services described in FIGS. 1-5 may also apply to the components, modules, and services of FIG. 6. Also, one or more of the operations and steps of FIGS. 1-5 may also be included in and/or occur prior to one or more operations or actions of FIG. 6.

As illustrated in FIG. 6, a device 602 1) connects to an IoT device gateway 604 using the device certificate by issuing transport layer security (TLS) handshake for registering the device certificate with a service provider environment. The IoT device gateway 604 can 2) issue an authentication request for the device certificate to an internal runtime IoT device identity service 606. That is, the runtime IoT device identity service 606 attempts to verify that the device certificate that is associated with the CA certificate and the device certificate is in an active state in a service provider environment. In this example, the device certificate is in an inactive or revoked state, and/or the CA certificate is unable to be located in the internal runtime IoT device identity service 606. The internal runtime IoT device identity service 606 3) sends a message to the IoT device gateway 604 that the authentication request to authenticate the device certificate has failed. In addition, the IoT device gateway 604 may send a TLS handshake failure notification to the device 602. As a result, a connection with the IoT device gateway 604 and the device 602 may be closed.

In summary, the device 602 may attempt to connect to the IoT device gateway 604 using the device certificate. The IoT device gateway 604 identities the device certificate as a registered certificate having an inactive or revoked state and/or is unable to locate the CA certificate in the service provider environment. The IoT device gateway 604 is unable to complete the TLS handshake and the TLS handshake fails. Thus, the IoT device gateway 604 may close the connection and/or channel with the device 602.

Figure 7:
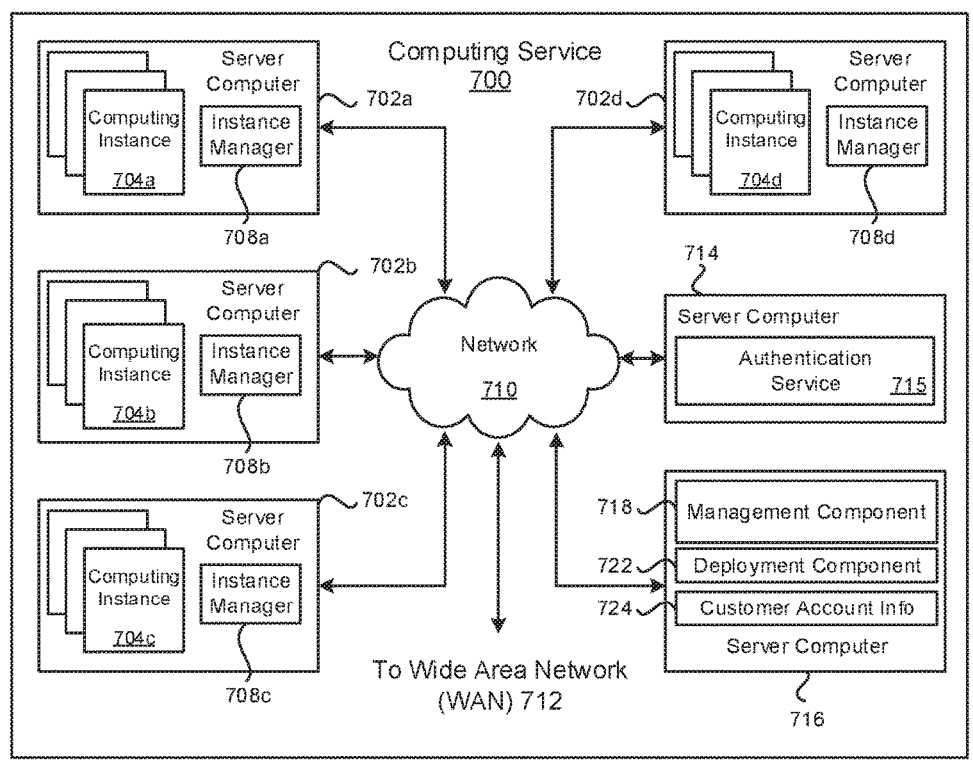
FIG. 7 is a block diagram that illustrates an example computing service environment that includes an authentication service according to an example of the present technology.

FIG. 7 is a block diagram illustrating an example computing service 700 that may be used to execute software services for certificate authentication for registering a certificate in a computing service environment. In particular, the computing service 700 depicted illustrates one environment in which the technology described herein may be used.

The computing service 700 may be one type of environment that includes various virtualized service resources that may be used, for instance, to host computing instances 704a-d on which a computing service may execute.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Illustratively, the computing service 700 may be described as a "cloud" environment.

The particularly illustrated computing service 700 may include a plurality of server computers 702a-d. While four server computers are shown, any number may be used, and large data centers may include thousands of server computers. The computing service 700 may provide computing resources for executing computing instances 704a-d. Computing instances 704a-d may, for example, be virtual machines. A virtual machine may be an instance of a software implementation of a machine (i.e., a computer) that executes applications like a physical machine. In the example of a virtual machine, each of the server computers 702a-d may be configured to execute an instance manager 708a-d capable of executing the instances. The instance manager 708a-d may be a hypervisor, virtual machine monitor (VMM), or another type of program configured to enable the execution of multiple computing instances 704a-d on a single server. Additionally, each of the computing instances 704a-d may be configured to execute one or more applications.

Some of the servers may be used for executing a certificate authentication. For example, a server computer 714 may execute an authentication service 715 in a service provider environment according to an example of the present technology.

One or more server computers 716 may be reserved to execute software components for managing the operation of the computing service 700 and the computing instances 704a-d. A server computer 716 may execute a management component 718. A customer may access the management component 718 to configure various aspects of the operation of the computing instances 704a-d purchased by a customer.

For example, the customer may setup computing instances 704a-d and make changes to the configuration of the computing instances 704a-d.

A deployment component 722 may be used to assist customers in the deployment of computing instances 704a-d. The deployment component 722 may have access to account information associated with the computing instances 704a-d, such as the name of an owner of the account, credit card information, country of the owner, etc. The deployment component 722 may receive a configuration from a customer that includes data describing how computing instances 704a-d may be configured. For example, the configuration may include an operating system, provide one or more applications to be installed in computing instances 704a-d, provide scripts and/or other types of code to be executed for configuring computing instances 704a-d, provide cache logic specifying how an application cache may be prepared, and other types of information. The deployment component 722 may utilize the customer-provided configuration and cache logic to configure, initialize, and launch computing instances 704a-d. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702a-d, 716. The network 710 may be a local area network (LAN) and may be connected to a Wide Area Network (WAN) 712 or the Internet, so that end customers may access the computing service 700. The network topology illustrated in FIG. 7 has been simplified; many more networks and networking devices may be utilized to interconnect the various computing systems disclosed herein.

Figure 8:
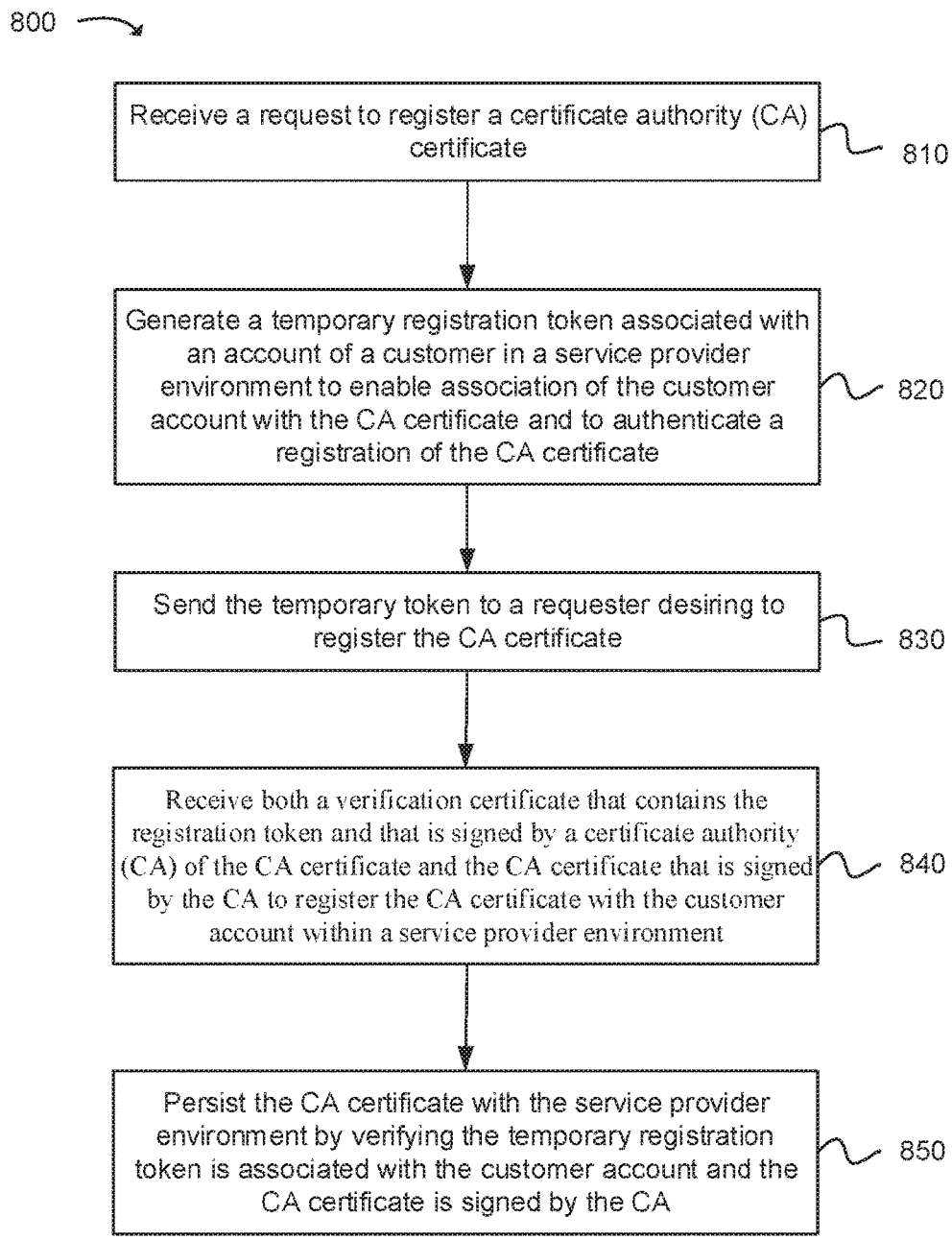
FIG. 8 is a flowchart of an example method for certificate authentication for registering a certificate authority (CA) certificate in a service provider environment according to an example of the present technology.

FIG. 8 is a flowchart of an additional example method 800 for mutual certificate authentication in a service provider environment according to an example of the present technology. The functionality 800 may be implemented as a method executed as instructions on a machine, where the instructions are included on at least one computer readable medium or one non-transitory machine-readable storage medium. Starting in block 810, a request to register a certificate authority (CA) certificate may be received. A registration token associated with an account of a customer in a service provider environment may be generated to enable association of the customer account with the CA certificate and to authenticate a registration of the CA certificate, as in block 820. The registration token may be sent to a requester desiring to register the CA certificate, as in block 830. A CA certificate that is signed by a certificate authority (CA) and the registration token that is associated with the customer account may be received to register the device certificate within a service provider environment, as in block 840. The CA certificate may be persisted with the service provider environment by verifying the registration token is associated with the customer account and the CA certificate is signed by the CA, as in block 850.

Figure 9:
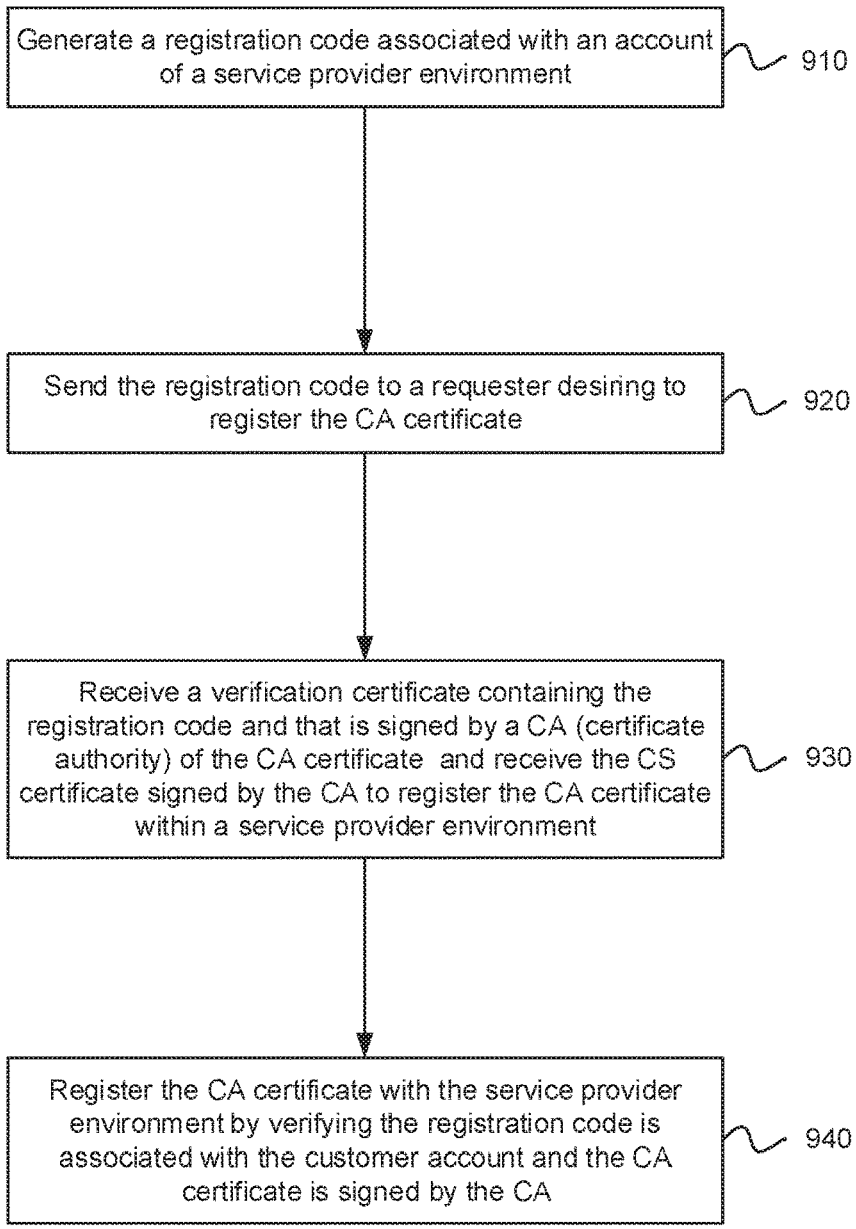
FIG. 9 is a flowchart of an additional example method for certificate authentication for registering a certificate authority (CA) certificate in a service provider environment according to an example of the present technology.

FIG. 9 is a flowchart of an additional example method 900 for mutual certificate authentication for registering a certificate authority (CA) certificate in a service provider environment according to an example of the present technology. The functionality 900 may be implemented as a method executed as instructions on a machine, where the instructions are included on at least one computer readable medium or one non-transitory machine-readable storage medium. Starting in block 910, a registration code associated with an account of a service provider environment may be generated. The registration code may be sent to a requester desiring to register the CA certificate, as in block 920. A CA (certificate authority) certificate associated with a certificate authority (CA) and the registration code may be received to register the CA certificate within a service provider environment, as in block 930. The CA certificate may be registered with the service provider environment by verifying the registration code is associated with the customer account and the CA certificate is signed by the CA, as in block 940.

Figure 10:
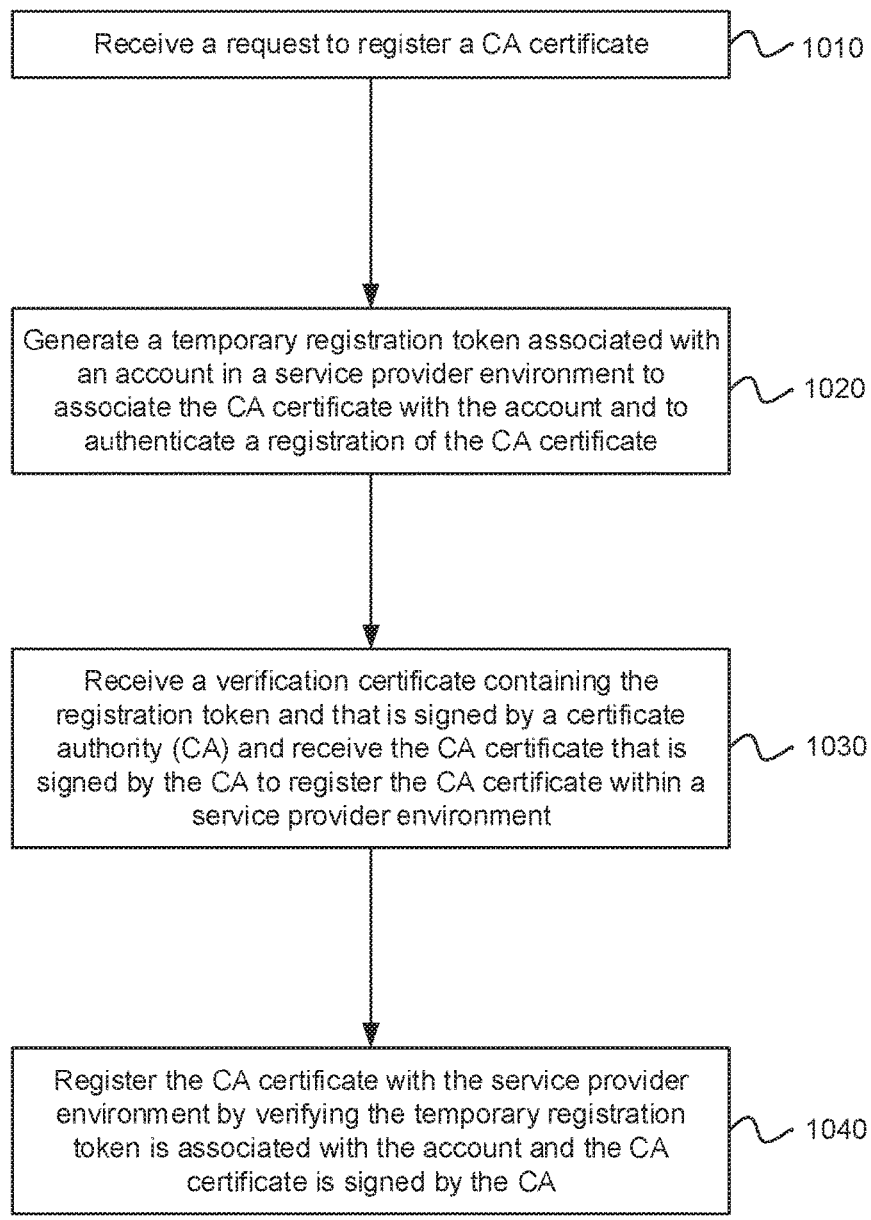
FIG. 10 is a flowchart of an additional example method for registering a Certificate Authority (CA) certificate in a service provider environment according to an example of the present technology.

FIG. 10 is a flowchart of an additional example method 1000 registering a Certificate Authority (CA) certificate in a service provider environment according to an example of the present technology. The functionality may be implemented as a method executed as instructions on a machine, where the instructions are included on at least one computer readable medium or one non-transitory machine-readable storage medium. Starting in block 1010, a request to register a CA certificate may be received. A registration token associated with an account in a service provider environment may be generated to associate the CA certificate with the account and to authenticate a registration of the CA certificate, as in block 1020. At block 1030, a CA certificate that is signed using by certificate authority (CA) and the registration token that is associated with the account to register the CA certificate within a service provider environment may be received. The CA certificate may be registered with the service provider environment by verifying the registration token is associated with the account and the CA certificate is signed by the CA, as in block 1040.

In one aspect, in conjunction with and/or as part of at least one block of FIGS. 6-8, the operations of 800, 900, and/or 1000 may include each of the following. The operations of 800, 900, and/or 100 may receive a request to register a device certificate and/or CA certificate. A connection may be established with the service provider upon receiving the request to register the device certificate and/or CA certificate. The connection may be quarantine with the service provider environment. The CA certificate using a public key of the CA and the registration code that is associated with the CA may be authorized and/or authenticated to register the CA certificate. A device certificate may be registered to access one or more services within the service provider environment by verifying authentication credentials associated with the service provider environment and the device certificate is associated with the CA certificate. Access to the service provider environment may be provided to one or more devices associated with the device certificate upon registering the device certificate. Access to one or more services within the service provider environment for the one or more devices associated with the device certificate may also be provided upon registering the device certificate. In addition, access to one or more compute service codes within the service provider environment may also be provided upon registering the device certificate. A registration state of the device certificate device may be changed and/or updated using the compute service codes.

Figure 11:
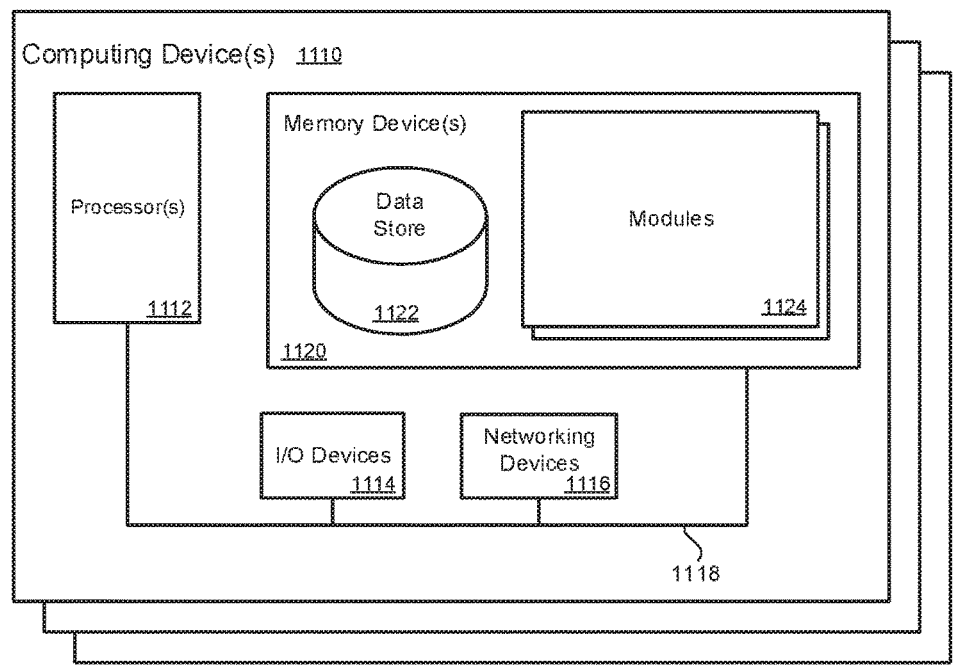
FIG. 11 is a block diagram that provides an example illustration of a computing device that may be employed in the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device 1120 may contain modules 1124 that are executable by the processor(s) 1112 and data for the modules 1124. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the Internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid-state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
    receiving a request to register a certificate authority (CA) certificate with a customer account within a service provider environment as a parent of device certificates associated with devices configured to communicate with the service provider environment;
    generating a registration token associated with an account of a customer in the service provider environment to enable association of the customer account with the CA certificate during a registration of the CA certificate for the customer account and to authenticate the registration of the CA certificate, wherein the registration token is stored in a data store of the service provider environment;
    sending the registration token to a requester;
    receiving a verification certificate that contains the registration token, wherein the verification certificate is signed by a certificate authority (CA) of the CA certificate, and the CA certificate is signed by the CA to register the CA certificate as the parent of the device certificates for the customer account within the service provider environment; and
    persisting the CA certificate within the data store of the service provider environment in response to verifying that the registration token is associated with the account of the customer and the CA certificate is signed by the CA.

2. The method of claim 1, further comprising authenticating the verification certificate using a public key of the CA and verifying that the registration token is associated with the CA.

3. The method of claim 1, further comprising authenticating a device certificate to access one or more services within the service provider environment when the device certificate is associated with the CA certificate.

4. The method of claim 1, further comprising establishing a temporary connection with the service provider environment upon receiving the request to register CA certificate to quarantine communications relating to the registration of the CA certificate as the parent of the device certificates.

5. The method of claim 1, further comprising:
    receiving a device certificate from a device;
    validating that the device certificate is subordinate to the CA certificate;
    registering the device certificate, when associated with the CA certificate, within the data store of the service provider environment; and
    enabling access to the service provider environment for the device associated with the device certificate upon registering the device certificate.

6. The method of claim 1, further comprising providing access to one or more compute service codes within the service provider environment upon registering a device certificate associated with the CA certificate.

7. A method, comprising:
    generating a registration code associated with an account of a service provider environment to enable registration of a CA (certificate authority) certificate with the service provider environment from which a subordinate certificate associated with a device of the account inherits trustworthiness,
    sending the registration code to a requester;
    receiving a verification certificate containing the registration code, wherein the verification certificate is signed by a CA (certificate authority) of the CA certificate; and
    registering the CA certificate with the service provider environment as a parent of the subordinate certificate by verifying the registration code is associated with the account of the service provider environment and the CA certificate is signed by the CA.

8. The method of claim 7, further comprising:
    receiving a request to register the device certificate with the service provider environment;
    validating that the device certificate is subordinate to the CA certificate;
    registering the device certificate when associated with the CA certificate; and
    enabling access to the service provider environment for the device associated with the device certificate upon registering the device certificate.

9. The method of claim 8, further comprising establishing a temporary connection with the service provider environment upon receiving the request to register the CA certificate.

10. The method of claim 9, further comprising:
    generating the verification certificate to include the registration code, wherein the verification certificate is a child certificate of the CA certificate; or
    quarantining the temporary connection with the service provider environment to communications relating to registration of the CA certificate as the parent of the device certificate.

11. The method of claim 7, further comprising authenticating the verification certificate using a public key of the CA and verifying that the registration code is associated with the CA to register the CA certificate within the service provider environment.

12. The method of claim 7, further comprising authorizing one or more devices associated with the device certificate to access one or more services within the service provider environment by verifying authentication credentials associated with the account of the service provider environment and that the device certificate is associated with the CA certificate.

13. The method of claim 12, further comprising enabling access to the service provider environment by the one or more devices associated with the device certificate upon registering the device certificate.

14. The method of claim 7, further comprising providing access to one or more services within the service provider environment for one or more devices associated with each additional device certificate associated with the CA certificate upon registering each one of the additional device certificates.

15. The method of claim 12, further comprising:
providing access to one or more compute service codes within the service provider environment upon registering the device certificate; and
changing a registration state of the device certificate device.

16. At least one non-transitory machine readable storage medium having instructions embodied thereon, the instructions when executed cause one or more processors and memory to:
receive a request to register, with an account in a service provider environment, a CA (certificate authority) certificate from which a subordinate certificate associated with a device of the account inherits trustworthiness;
generate a registration token associated with the account in the service provider environment that associates the CA certificate with the account and enables authentication of a registration of the CA certificate within a data store of the service provider environment as a parent of the device certificate;
receive a verification certificate containing the registration token and that is signed by a certificate authority (CA) and receive the CA certificate that is signed by the CA; and
register the CA certificate within the data store of the service provider environment as the parent of the device certificate by verifying the registration token is associated with the account and the CA certificate is signed by the CA.

17. The at least one non-transitory machine readable storage medium of claim 16, wherein the instructions when executed cause the one or more processors and memory to establish a temporary connection with the service provider upon receiving the request to register the CA certificate to quarantine communications relating to a registration of the CA certificate as the parent of the device certificate.

18. The at least one non-transitory machine readable storage medium of claim 17, wherein the instructions when executed cause the one or more processors and memory to generate the verification certificate to include the registration token, wherein the verification certificate is a child certificate of the CA certificate.

19. The at least one non-transitory machine readable storage medium of claim 16, wherein the instructions when executed cause the one or more processors and memory to:
authenticate the CA certificate using a public key of the CA;
verify the registration token that is associated with the account; and
register the CA certificate within the service provider environment as the parent of the device certificate by verifying the registration token is associated with the CA and the CA certificate is signed by the public key of the CA.

20. The at least one non-transitory machine readable storage medium of claim 16, wherein the instructions when executed cause the one or more processors and memory to:
enable access to the service provider environment by one or more devices associated with the device certificate upon registering the device certificate with the service provider environment; and
provide access to one or more compute service codes within the service provider environment upon registering the device certificate to change a registration state of the device certificate.

* * * * *